United States Patent
Pan

(12) United States Patent (10) Patent No.: US 7,895,939 B2
(45) Date of Patent: Mar. 1, 2011

(54) DUAL MODE TEA FLASK

(76) Inventor: Chih-Teng Pan, Taipei (TW)

( * ) Notice: Subject to any disclaimer, the term of this patent is extended or adjusted under 35 U.S.C. 154(b) by 563 days.

(21) Appl. No.: 12/014,916

(22) Filed: Jan. 16, 2008

(65) Prior Publication Data
US 2009/0178573 A1 Jul. 16, 2009

(51) Int. Cl.
*A47J 31/20* (2006.01)
*A47J 31/06* (2006.01)

(52) U.S. Cl. .............................. 99/322; 99/323; 99/317

(58) Field of Classification Search ............... 99/322, 99/317, 318, 319, 323
See application file for complete search history.

(56) References Cited

U.S. PATENT DOCUMENTS

| | | | | |
|---|---|---|---|---|
| 3,181,951 | A * | 5/1965 | Gronvold | 426/433 |
| 6,202,542 | B1 * | 3/2001 | Melton | 99/322 |
| 6,276,262 | B1 * | 8/2001 | Chen | 99/322 |
| 7,318,374 | B2 * | 1/2008 | Guerrero | 99/322 |
| 2008/0282900 | A1 * | 11/2008 | Huang | 99/322 |

* cited by examiner

*Primary Examiner* — Reginald L Alexander
(74) *Attorney, Agent, or Firm* — Alan Kamrath; Kamrath & Associates PA

(57) ABSTRACT

A tea flask has a body, a sleeve, a strainer and a lid. The sleeve of the tea flask is mounted sealably on the body, the strainer is mounted in the sleeve, and the lid is mounted sealably on the sleeve to cover the strainer. When using the tea flask, the lid is removed from the sleeve, tealeaves are added to the strainer, and hot water is poured into the body. The lid is mounted on the sleeve of the tea flask. Then, the tea flask is inverted to let the tealeaves steep in the hot water. Seals on the sleeve and lid of the tea flask prevent hot water from leaking out the body. When ready, lid attached to the strainer is removed and tea is poured. This is more hygienic, ensures better taste since the tealeaves do not become stewed and prevent the strainer scalding or burning people.

7 Claims, 9 Drawing Sheets

DUAL MODE TEA FLASK

BACKGROUND OF THE INVENTION

1. Field of the Invention

The present invention relates to a tea flask and, especially, to a dual mode tea flask having a steeping and a storing configuration.

2. Description of the Related Art

With reference to FIG. 8, a conventional tea flask (2) has a body (21) and a lid (22).

The body (21) is an open container and has a top edge, an inner space (211) and an outer surface. The outer surface near the top edge of the body (21) is formed with a thread (212). The lid (22) has an inner surface and an inner thread (221) formed on the inner surface. The inner thread (221) of the lid (22) corresponds to the thread (212) in order to securely mount the lid (22) detachably to the body (21).

When using the conventional tea flask (2), the lid (22) is opened and tealeaves are placed in the tea flask (2). Hot water is poured into the tea flask (2), and the tea is steeped. However, when tealeaves are steeped for a long time, flavor deteriorates due to oxidation, or the tealeaves become stewed causing a bitter taste. In the conventional tea flask (2), the tea is always mixed with tealeaves and so must be drunk quickly.

With further reference to FIG. 9, another conventional tea flask (3) has a body (31), a strainer (32) and a lid (33). The body (31) is an open container and has a top edge, and the top edge has a shoulder (311) to support the strainer (32).

When using the conventional tea flask (3), the lid (33) is removed, and tealeaves are placed into the strainer (32). The strainer (32) is placed against the shoulder (311) of the body (31), and hot water is poured into the body (31). Then, the lid (33) is placed over the strainer (32) and the body (31) to steep the tea. However, the strainer (32) of the conventional tea flask (3) has to be removed and placed aside before the tea in the body (31) can be drunk or poured, which is also inconvenient. Moreover, because the strainer (32) has been soaking in the hot water for a while and is hot, the strainer may cause accidental scalding when removed. The strainer (32) is messy since the leaves in the strainer (32) continue dripping water.

According to the foregoing description of the conventional tea flasks (2, 3), an improved tea flask that is more convenient is required.

SUMMARY OF THE INVENTION

The main objective of the present invention is to provide a dual mode tea flask having a steeping and a storing operation.

To achieve the foregoing objective, the tea flask in accordance with the present invention comprises a body, a sleeve, a strainer and a lid. The sleeve of the tea flask is mounted sealably on the body, the strainer is mounted sealably in the sleeve, and the lid is covered on the sleeve and the strainer. When using the tea flask, the lid is removed from the sleeve, tealeaves are added to the strainer, and hot water is poured into the body. The lid is mounted on the sleeve of the tea flask. Then, the tea flask is inverted to let the tealeaves steep in the hot water. Seals on the sleeve and lid of the tea flask prevent hot water from leaking out the body. When ready, the lid attached to the strainer is removed, and tea is poured. This is more hygienic, ensures better taste since the tealeaves do not become stewed, and prevents the strainer scalding or burning people.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
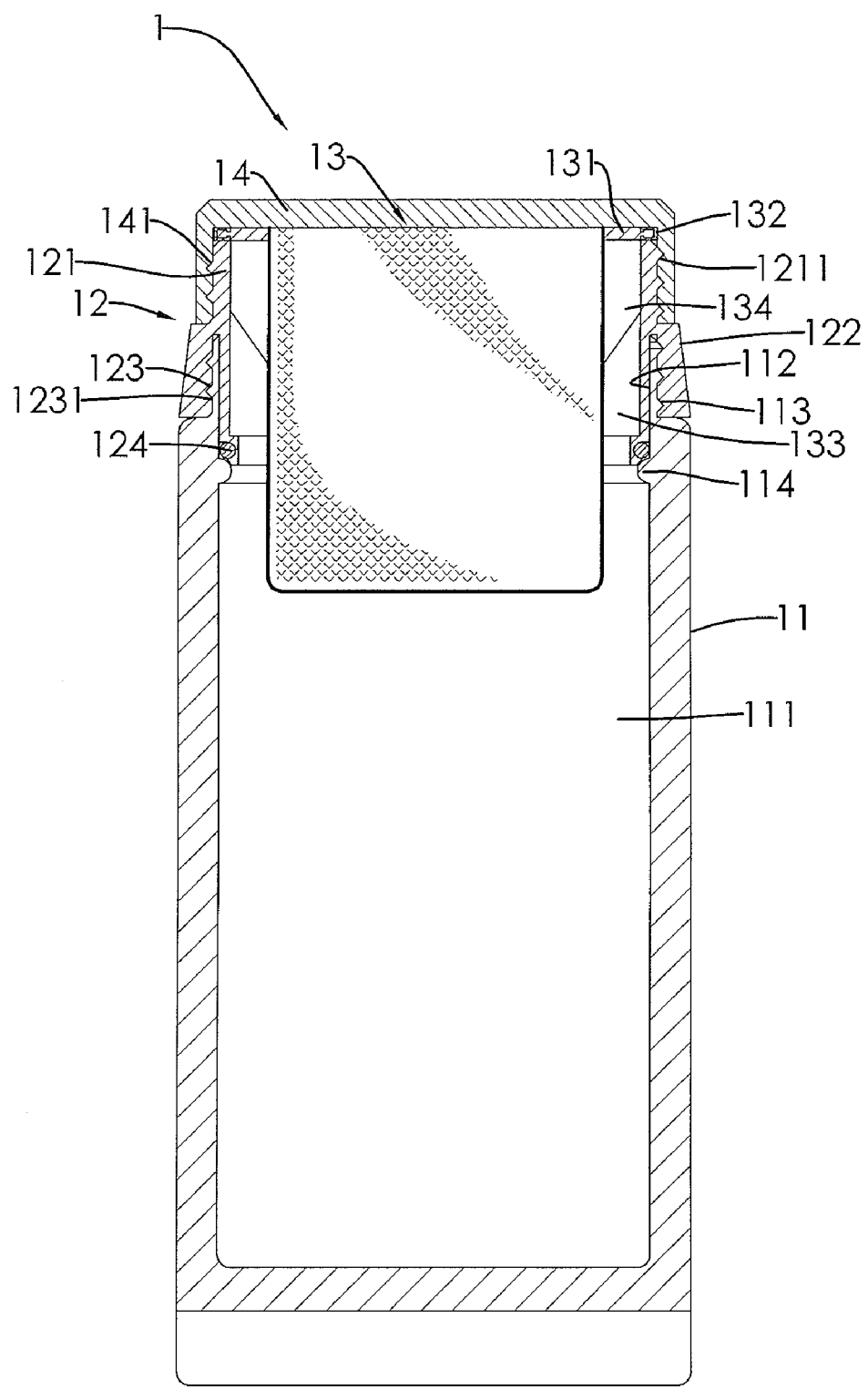
FIG. 1 is a side view in partial section of a tea flask in accordance with the present invention.
Figure 2:
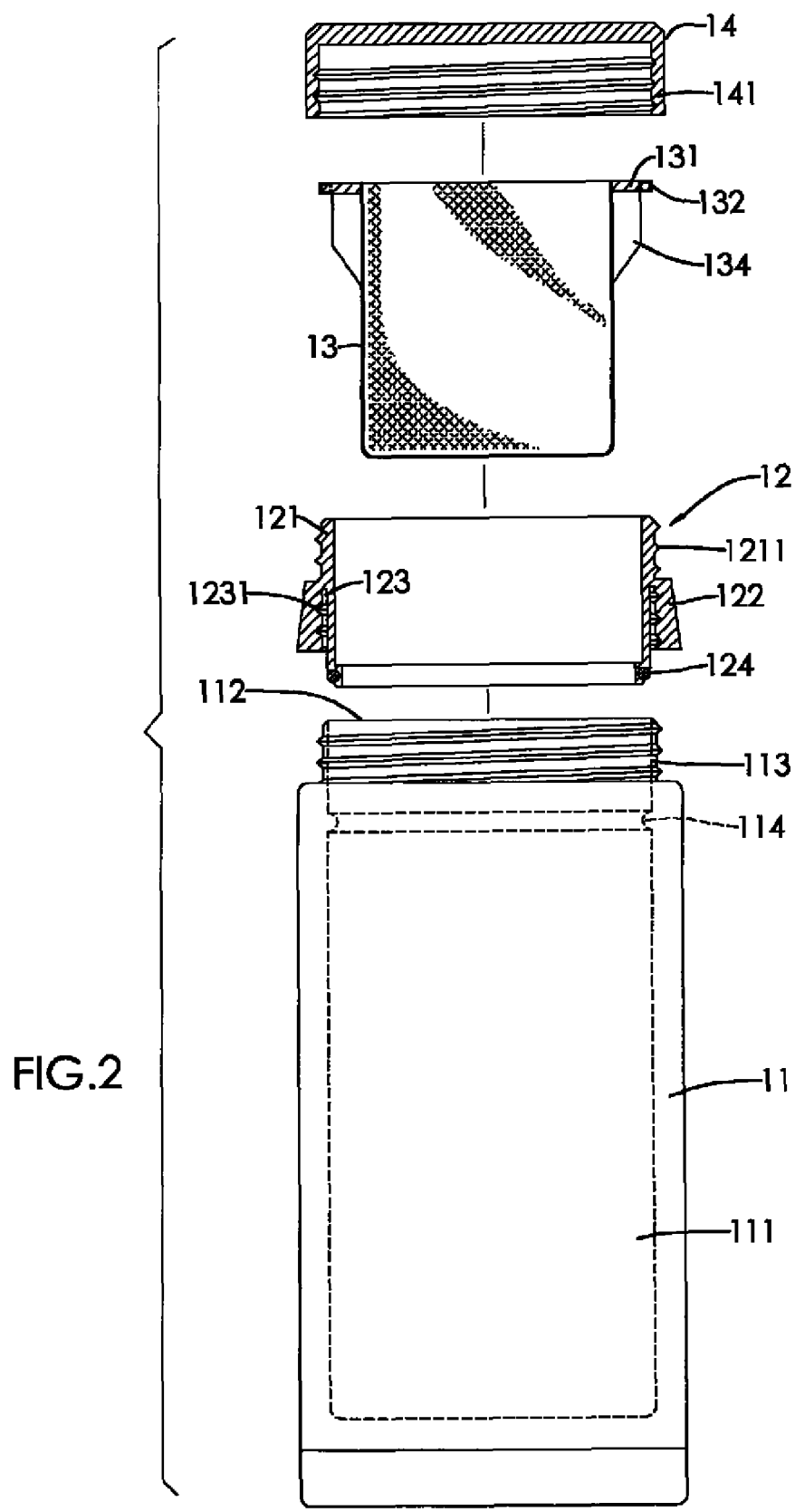
FIG. 2 is an exploded side view of the tea flask in FIG. 1.
Figure 3:
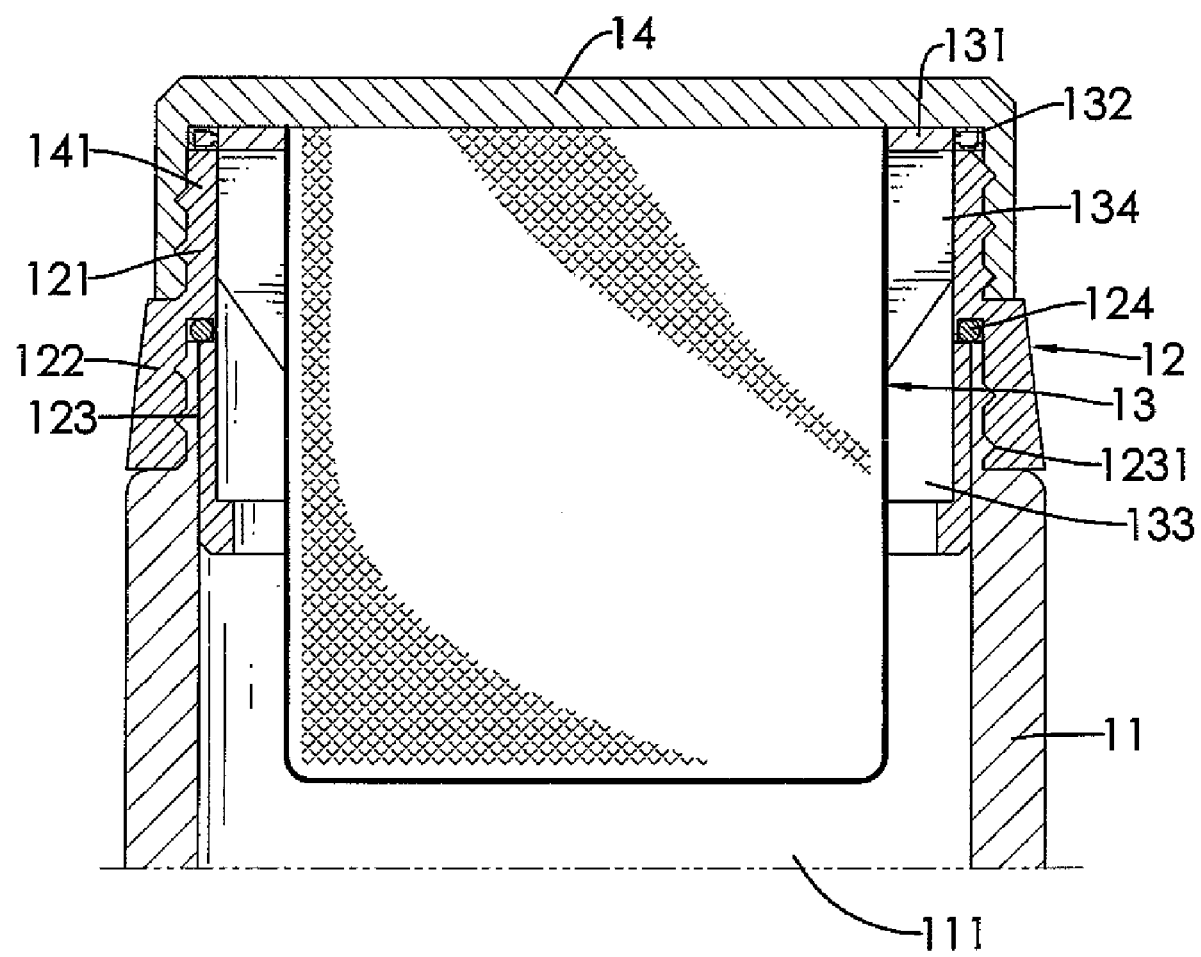
FIG. 3 is an enlarged side view in partial section of the tea flask in FIG. 1.
Figure 4:
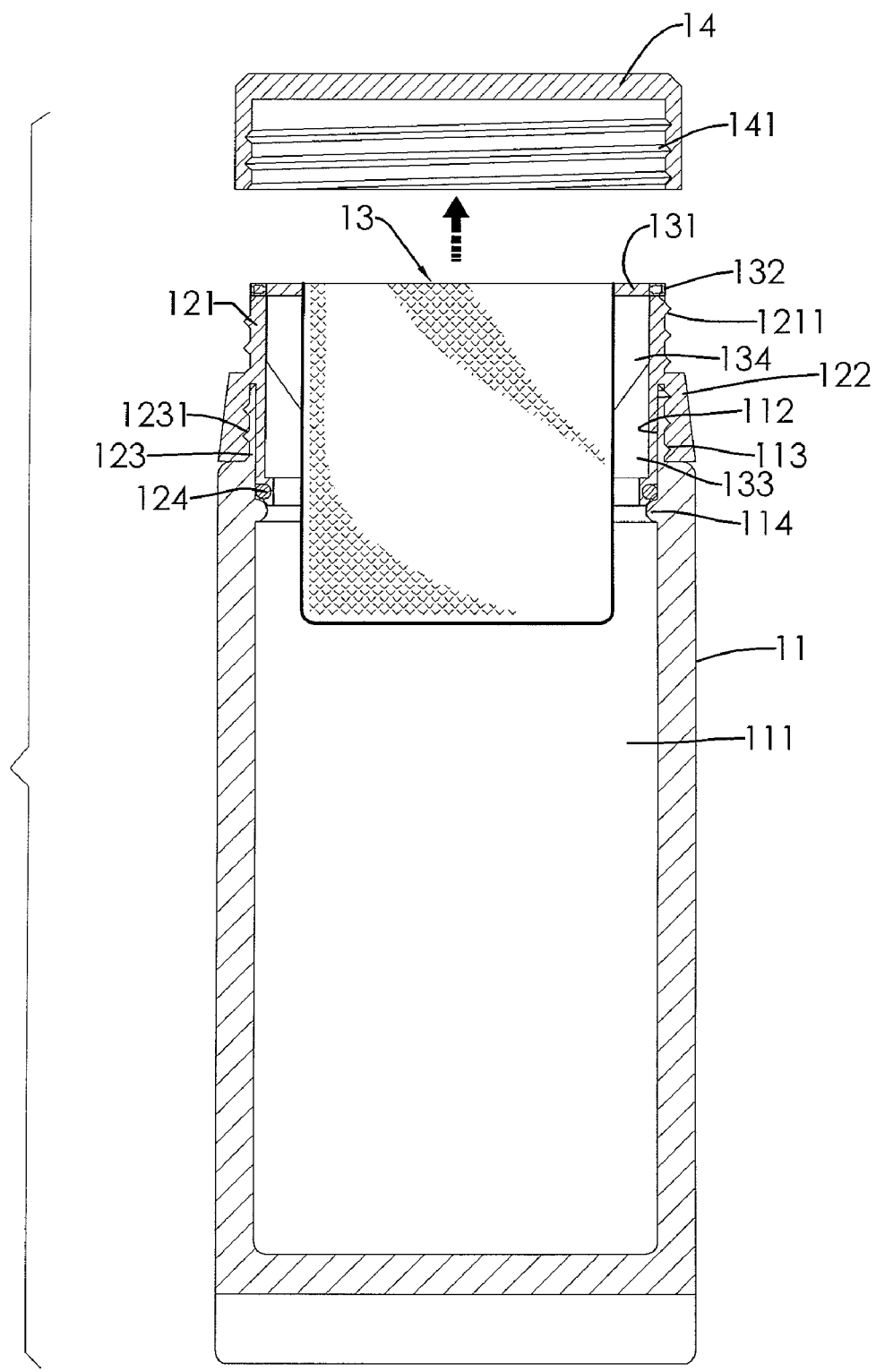
FIG. 4 is an operational side view of the tea flask in FIG. 1, shown in a filling configuration.
Figure 5:
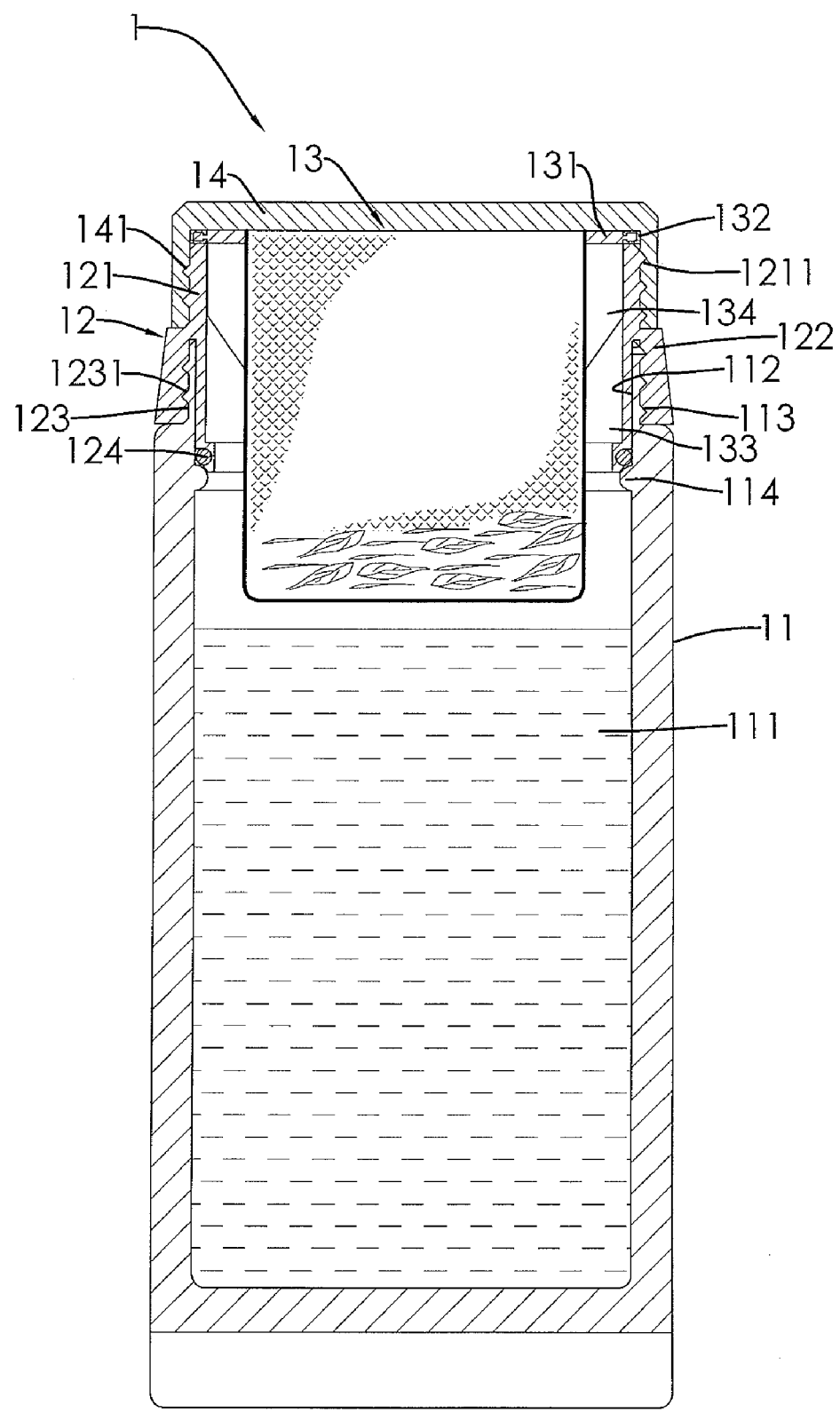
FIG. 5 is an operational side view of the tea flask in FIG. 1, shown in a storage configuration.
Figure 6:
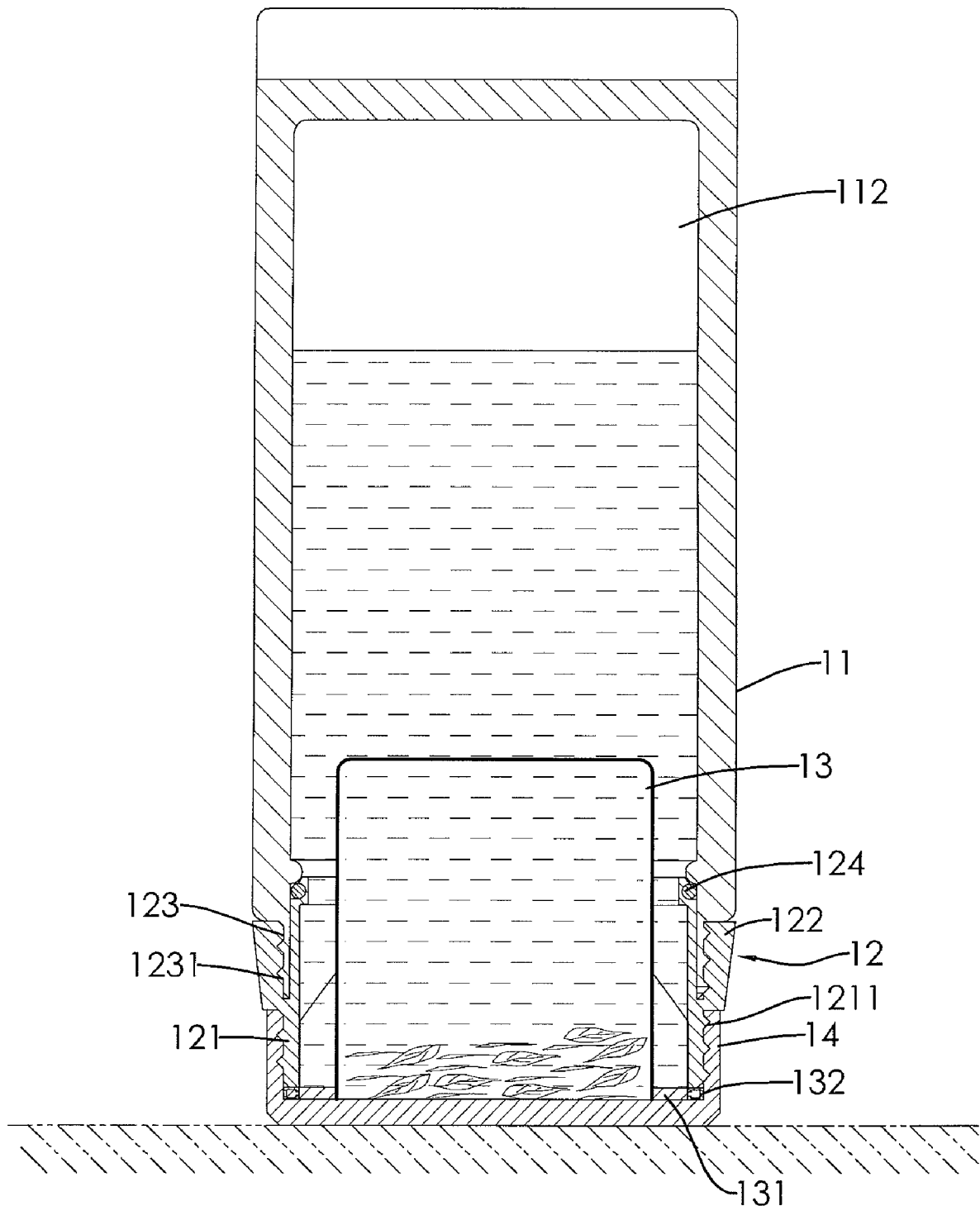
FIG. 6 is an operational side view of the tea flask in FIG. 1, shown in a steeping configuration.
Figure 7:
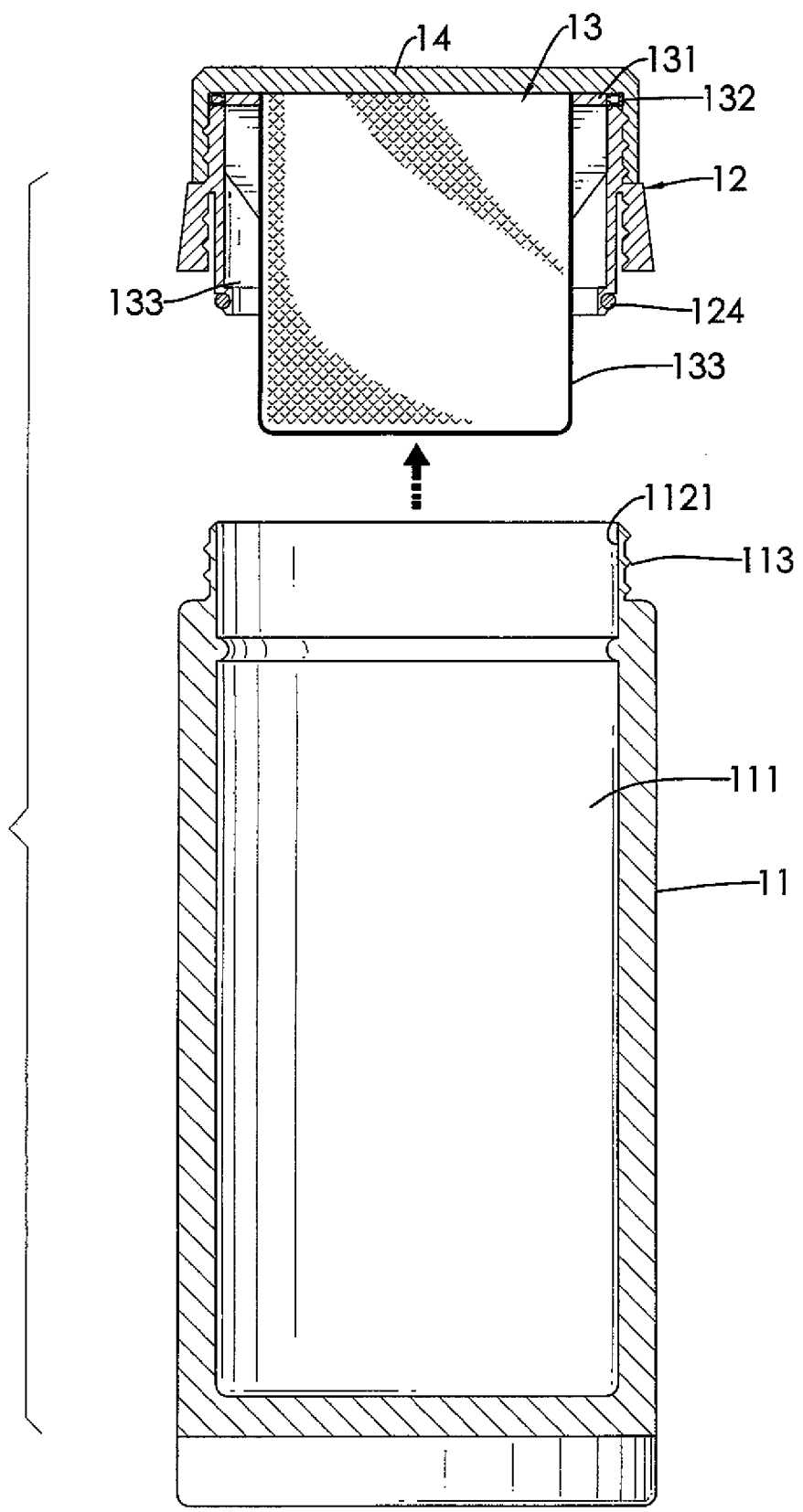
FIG. 7 is an operational side view of the tea flask in FIG. 1, shown in a pouring configuration.
Figure 8:
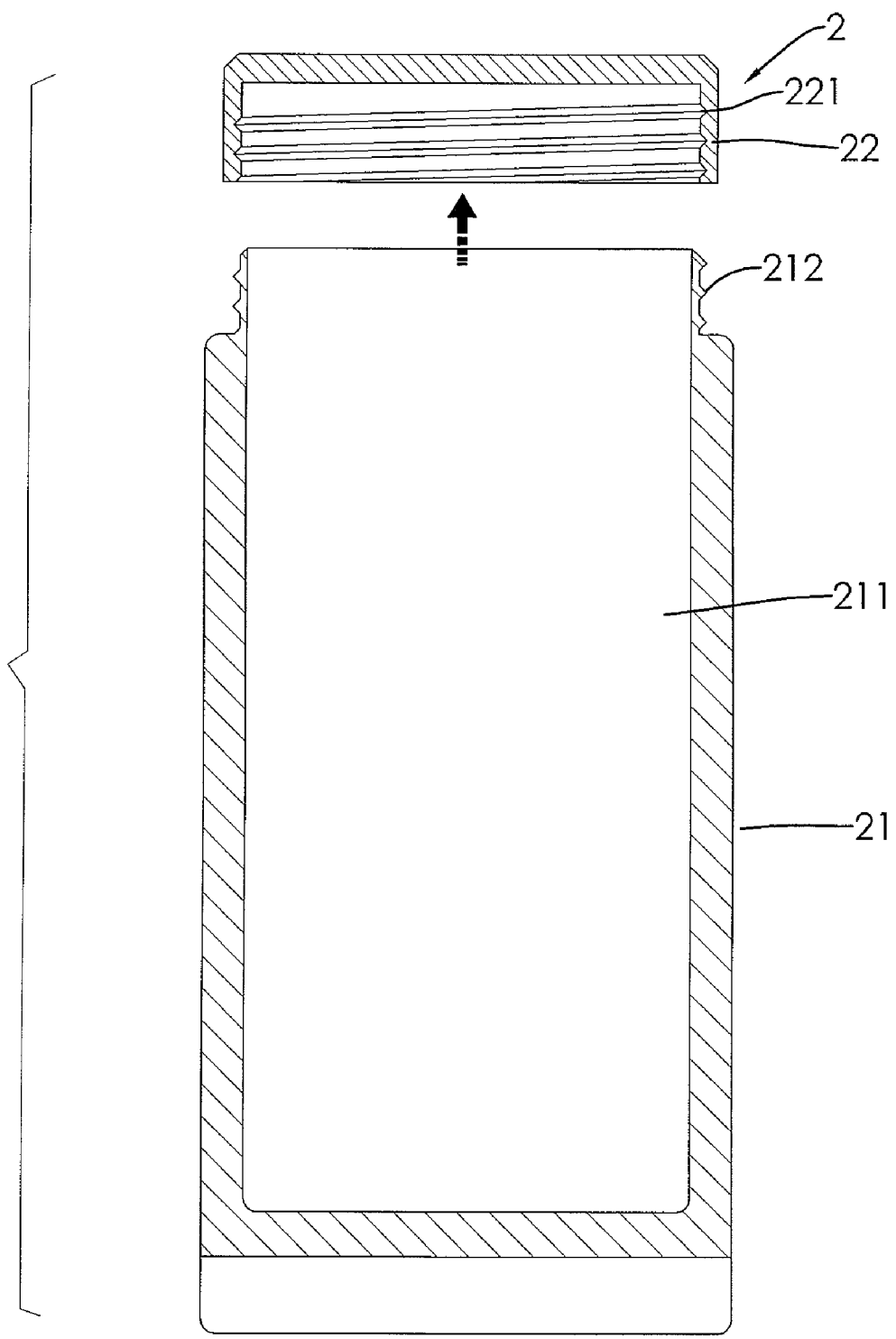
FIG. 8 is an operational side view of a conventional tea flask in accordance with the prior art.
Figure 9:
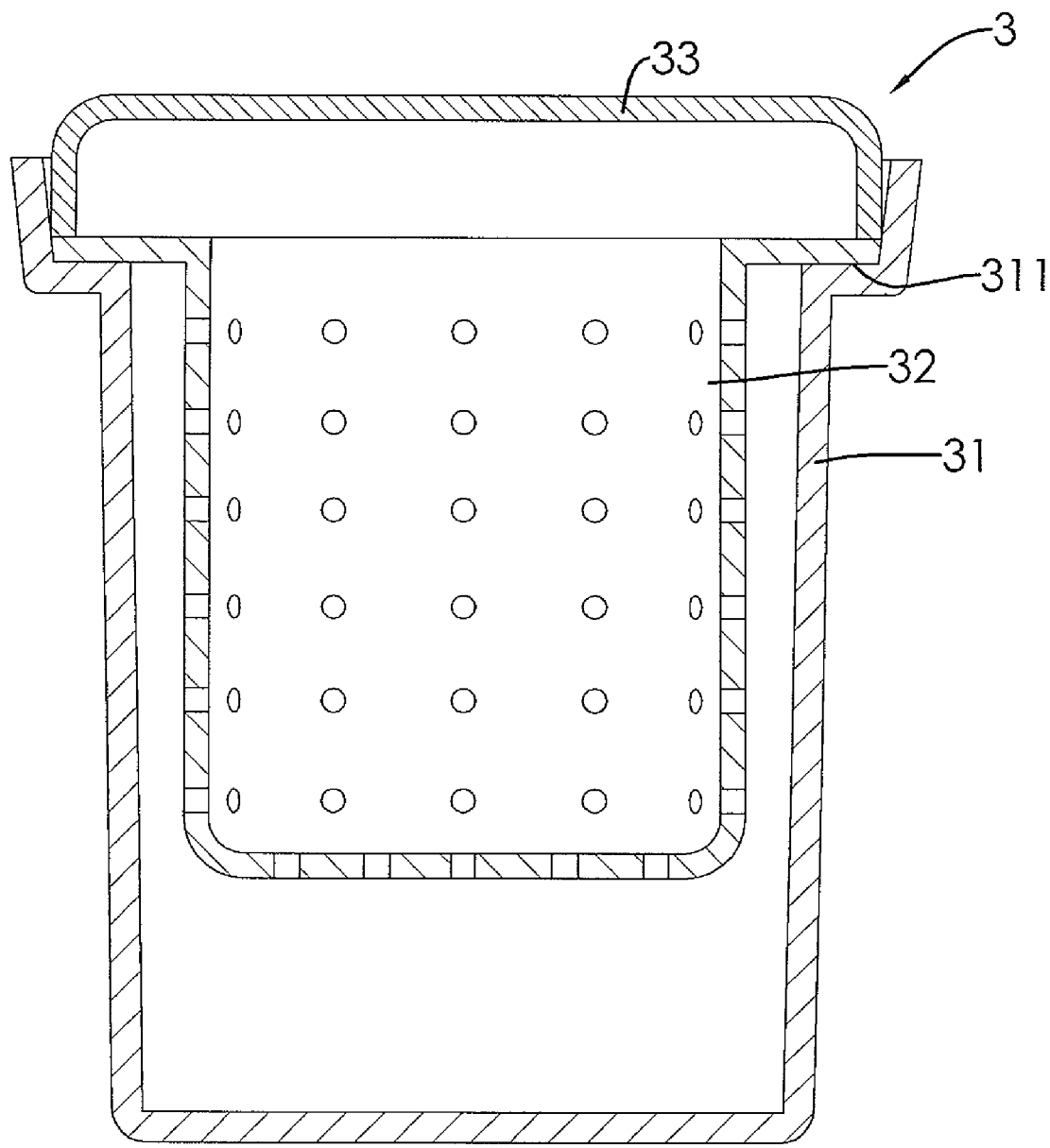
FIG. 9 is an operational side view of another conventional tea flask in accordance with the prior art.

With reference to FIGS. 1, 2 and 3, a dual mode tea flask (1) in accordance with the present invention comprises a body (11), a sleeve (12), a strainer (13) and a lid (14).

The body (11) is an open container and may be a vacuum flask. The body (11) has an inner surface (111), an outer surface, a rim, an opening (112), an optional sealing rib (114) and an optional thread (113). The inner surface (111) is formed inside the body (11). The opening (112) is formed at the rim of the body (11). The sealing rib (114) is formed on and protrudes from the inner surface adjacent to the opening (112) of the body (11). The thread (113) may be formed on the outer surface adjacent to the opening (112) of the body (11).

The sleeve (12) is securely mounted detachably on the opening (112) of the body (11) and has a flask end, a lid end, an outside wall, an optional inner collar (121), an optional outer collar (122), an optional recess (123), an optional inner thread (1231) and an optional seal (124).

The inner collar (121) is formed around the outside wall of the sleeve (12) and has an outer surface. An optional outer thread (1211) is formed around the outer surface of the inner collar (121) adjacent to the lid end of the sleeve (12). The outer collar (122) is formed around the outer surface of the inner collar (121) and has an inner surface. The recess (123) is formed between the outer surface of the inner collar (121) and the inner surface of the outer collar (122) adjacent to the flask end of the sleeve (12). The inner thread (1231) is formed on the inner surface of the outer collar (122) and corresponds to the thread (113) of the body (11).

The seal (124) prevents liquid leakage from the body (11), is mounted at the flask end of the sleeve (12), and corresponds to the sealing rib (114) of the cup body (11). The seal (124) may be mounted in the recess (123) of the sleeve (12) abutting the opening (112) of the body (11) as shown in FIG. 3.

The strainer (13) is a porous open container and may be metal or plastic. The strainer (13) is mounted in the sleeve (12) and has an opening, a gap (133), an optional mounting ring (131) and an optional seal (132). The gap (133) is formed between the strainer (13) and the sleeve (12) to receive the water from the strainer (13). The mounting ring (131) is formed around the opening of the strainer (13) and may have an inner surface, an outer surface and multiple optional struts (134). The struts (134) are formed on the inner surface of the mounting ring (131) to support the mounting ring (131) on the opening of the strainer (13) and help the strainer (13) precisely mounted into the right position of the sleeve (12). The seal (132) of the strainer (13) may be mounted on the outer surface of the mounting ring (131).

The lid (14) is securely mounted detachably on the sleeve (12) to cover the strainer (13) and has an inner surface and an optional thread (141). The thread (141) is formed on the inner surface of the lid (14), corresponds to the outer thread (1211) of the sleeve (12) and securely holds the lid (14) detachably on the sleeve (12).

With further reference to FIGS. 4 to 7, when using the tea flask (1) as described, the lid (14) is removed from the sleeve (12), tealeaves are placed into the strainer (13), and hot water is poured into the body (11). Then, the lid (14) is mounted onto the sleeve (12) of the tea flask (1). Now, the tea flask may be carried conveniently around, on a picnic, to work, hiking or the like. When tea is desired, the tea flask (1) is inverted to allow the tealeaves in the strainer (13) to steep in the hot water. The seal (124) of the tea flask (1) prevents hot water from leaking out of the body (11). Once steeped as desired and ready for drinking, the tea flask (1) is again inverted, and the sleeve (12) and the lid (14) are removed from the body (11) so the tea can be poured easily.

The tea flask (1) as described allows someone to pour tea made in the tea flask (1) without having to remove and put down the strainer (13). This is more hygienic, especially if hiking, and ensures better taste since the tealeaves do not become stewed. Since the strainer (13) is held by the sleeve (12) and the lid (14), the strainer (13) cannot burn people.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A dual mode tea flask comprising:
    a body being an open container comprising
        an inner surface formed inside the body;
        an outer surface;
        a rim;
        an opening being formed at the rim of the body; and
        a thread formed on the outer surface adjacent to the opening of the body;
    a sleeve securely mounted detachably on the opening of the body and comprising
        an outside wall;
        a lid end;
        a flask end;
        an inner collar formed around the outside wall of the sleeve and having an outer surface and an outer thread formed around the outer surface of the inner collar adjacent to the lid end of the sleeve;
        an outer collar formed from the outer surface of the inner collar and having an inner surface;
        a recess formed between the outer surface of the inner collar and the inner surface of the outer collar adjacent to the flask end of the sleeve; and
        an inner thread formed on the inner surface of the outer collar and corresponding to the thread of the body;
    a strainer being a porous open container and mounted in the sleeve and comprising:
        an opening;
        a mounting ring formed around the opening of the strainer and having
            an inner surface;
            an outer surface;
            multiple struts formed on the inner surface of the mounting ring; and
            a seal mounted on the outer surface of the mounting ring; and
    a lid securely mounted detachably on the sleeve to cover the strainer and comprising an inner surface and a thread formed on the inner surface of the lid and corresponding to the outer thread of the sleeve.

2. The dual mode tea flask as claimed in claim 1, wherein the body further comprises a sealing rib formed on and protruding from the inner surface adjacent to the opening of the body; and
    the sleeve further has another seal formed at the flask end of the sleeve and corresponding to the sealing rib of the body.

3. The dual mode tea flask as claimed in claim 1, wherein the sleeve further has another seal mounted in the recess of the sleeve and abutting the opening of the body.

4. The dual mode tea flask as claimed in claim 2, wherein the strainer is metal.

5. The dual mode tea flask as claimed in claim 3, wherein the strainer is metal.

6. The dual mode tea flask as claimed in claim 2, wherein the strainer is plastic.

7. The dual mode tea flask as claimed in claim 3, wherein the strainer is plastic.

* * * * *